(12) United States Patent
Mase et al.

(10) Patent No.: US 8,277,277 B2
(45) Date of Patent: Oct. 2, 2012

(54) BLASTING METHOD AND BLASTING MACHINE

(75) Inventors: Keiji Mase, Tokyo (JP); Shozo Ishibashi, Tokyo (JP)

(73) Assignee: Fuji Manufacturing Co., Ltd., Tokyo (JP)

( * ) Notice: Subject to any disclaimer, the term of this patent is extended or adjusted under 35 U.S.C. 154(b) by 960 days.

(21) Appl. No.: 12/254,379

(22) Filed: Oct. 20, 2008

(65) Prior Publication Data

US 2009/0130959 A1    May 21, 2009

(30) Foreign Application Priority Data

Nov. 19, 2007    (JP) .................................. 2007-299710

(51) Int. Cl.
*B24C 3/00*    (2006.01)
(52) U.S. Cl. .................... 451/2; 451/5; 451/38; 451/40; 451/88; 451/89
(58) Field of Classification Search .................. 451/2, 5, 451/10, 11, 38, 39, 40, 87, 88, 89, 90
See application file for complete search history.

(56) References Cited

U.S. PATENT DOCUMENTS 6,146,247 A * 11/2000 Nokubi et al. .................. 451/40

FOREIGN PATENT DOCUMENTS

| CN | 1038235 A | 12/1989 |
|----|-----------|---------|
| JP | 510673 A | 1/1993 |
| JP | 09314468 A | 12/1997 |
| JP | 1137945 A | 12/1999 |
| JP | 2001038629 A | 2/2001 |
| JP | 2001207160 B2 | 7/2001 |
| JP | 2003211259 A | 7/2003 |
| JP | 2007030122 A | 2/2007 |

OTHER PUBLICATIONS

First Office Action cited in corresponding Chinese Patent Application No. 200810177745.X.
Office Action dated Jul. 30, 2012 from corresponding JP patent application No. 2007-299710.

* cited by examiner

*Primary Examiner* — Eileen P. Morgan
(74) *Attorney, Agent, or Firm* — Porzio, Bromberg & Newman, P.C.

(57) ABSTRACT

In blasting with an abrasive containing liquid to confer elasticity, the abrasive from which liquid evaporates in the course of continuance use is uniformly supplied with liquid. Liquid for swelling an elastic abrasive is sprayed in an air flow for transporting the abrasive in a blasting machine 1 including an abrasive-recovery duct 91 communicating between a bottom of a cabinet 2 and an abrasive-recovery tank 3, the abrasive-recovery tank 3, a compressed gas before being introduced into a blasting gun 8, and so forth. Since the abrasive being transported in the air flow is separated into individual particles, each abrasive can be uniformly supplied with liquid.

11 Claims, 7 Drawing Sheets

BLASTING METHOD AND BLASTING MACHINE

BACKGROUND OF THE INVENTION

1. Field of the Invention

The present invention relates to a blasting method and a blasting machine used for the blasting method and, more particularly, to a blasting method and a blasting machine in which an abrasive containing a certain amount of water or other liquid is used to confer desired elasticity (such abrasive is referred to as "elastic abrasive" in the specification).

2. Description of the Related Art

Compared with polishing using an abrasive paper, an abrasive cloth, a grindstone or the like, blasting in which an abrasive is ejected onto the surface of a workpiece along with a compressed gas, such as compressed air, can be applied relatively easily to an intricately shaped object. Therefore, blasting is widely used for various purposes, including cleaning of mold surfaces, removal of oxide films, and deburring of various products.

For such blasting, sands or abrasive grains are generally used as the abrasive. Therefore, when the abrasive is bombarded on the surface of a product, indentations are formed in the surface. These indentations in the surface of the processed product lead to a rough, satin-like finish similar to the surface of a pear.

For the reason, blasting cannot be employed for products whose processed surface needs to be a smooth or mirror-like surface. If blasting should be employed for such products, additional processing such as deburring needs to be carried out, followed by further lapping or buffing to make the product surface smooth by removing irregularities formed by blasting.

In the manner, blasting has an advantage in that it can be applied to workpieces having various shapes, in other words, can be applied even to intricately shaped workpieces, relatively easily. On the other hand, blasting has a disadvantage in that it processes the surface of a workpiece to a satin-like finish if a general abrasive is used, and therefore, it cannot be employed for applications or materials in which the formation of a satin-like finish is not desired.

To overcome the disadvantage, a blasting method for projecting an elastic abrasive at an incident angle oblique to the surface of a workpiece to provide a mirror-like finish or a smooth surface without forming irregularities on the surface of the processed workpiece has also been proposed. According to the method, the abrasive itself is deformed when it is bombarded on the surface of the workpiece due to the elasticity of the abrasive, and no indentations (irregularities) are formed. In addition, since the elastic abrasive slides on the surface of the workpiece after it has been bombarded on the surface, the workpiece surface can be processed to a flat surface or a mirror-like finish.

A proposed elastic abrasive used for such a blasting method is formed by carrying on abrasive powders (abrasive grains) to the surface of an elastic porous carrier made of, for example, natural vegetable fibers (Japanese Unexamined Patent Publication No. HEI 9-314468). If a carrier formed of vegetable fibers contains water, it polishes the surface of the workpiece almost to a mirror-like finish. However, heat generated during polishing causes water in the carrier to evaporate, thereby decreasing the viscosity and elasticity of the carrier. As a result, the workpiece is processed to a satin-like finish. It should also be pointed out that a recovery rate of the abrasive decreases because of, for example, crushing of the carrier. To prevent the decrease in the recovery rate, blasting with the elastic abrasive formed by adhering abrasive grains onto a carrier made of gelatin containing an evaporation-preventing agent by an adhesive force of the water contained in the carrier has also been proposed (Japanese Patent No. 3376334).

Figure 7:
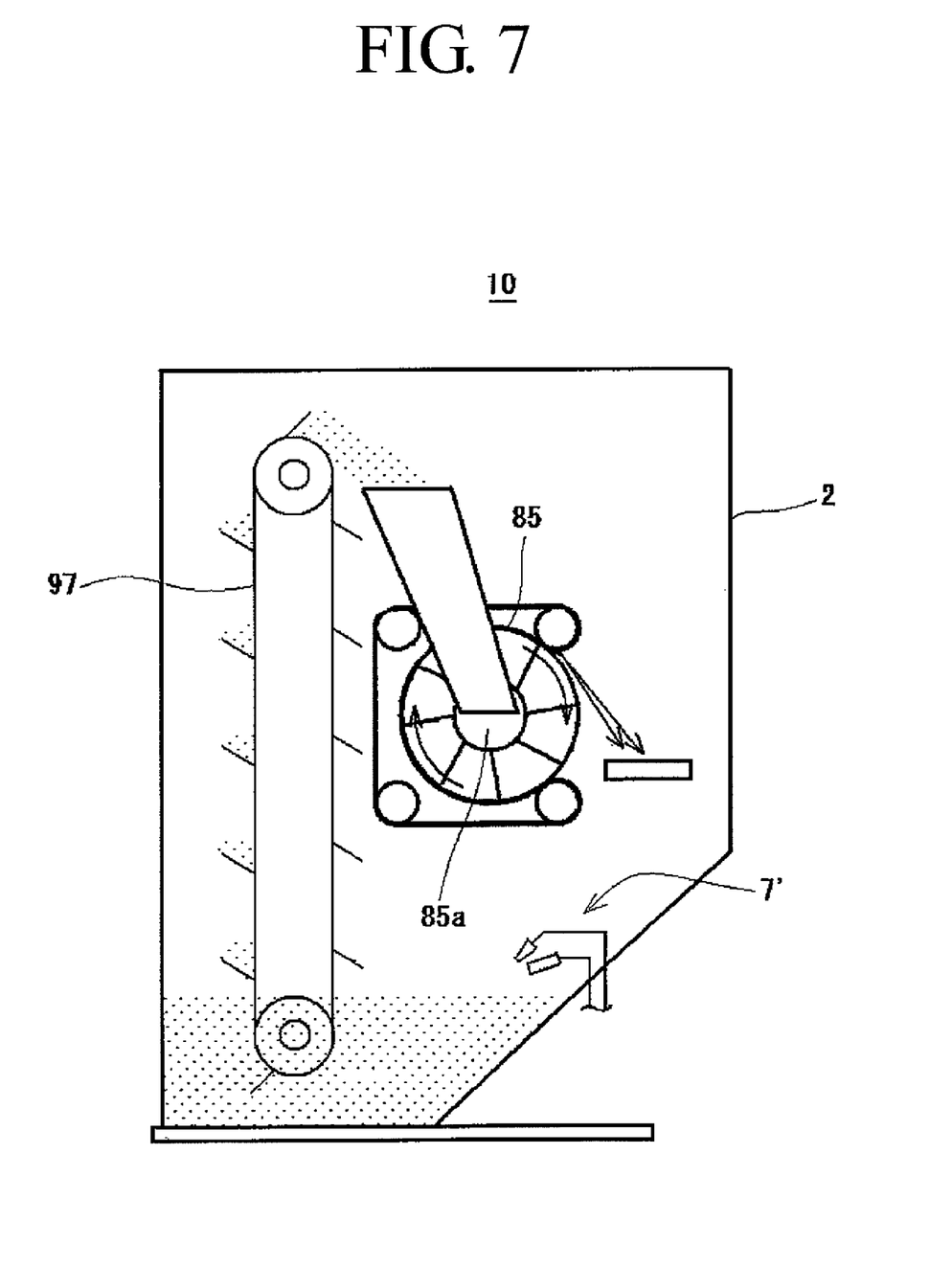
FIG. 7 is a schematic illustration of an abrasive machine ('359 application) provided with known water-supply means.

Furthermore, although optimal polishing is ensured while water is retained in the abrasive, water evaporation cannot be completely prevented because the abrasive is continuously used. Although a water-evaporation-preventing agent is contained in the abrasive, a certain degree of water evaporation still occurs. To overcome the problem, an abrasive machine 10 as shown in FIG. 7 has been proposed. In the abrasive machine 10, the abrasive accumulated at the bottom of a cabinet 2 is transported on a conveyor belt 97 up to an opening 85*a* of an ejecting rotor 85 rotating at the top of the cabinet 2, the abrasive is projected onto a workpiece W also disposed in the cabinet 2 by a centrifugal force along with the rotation of the ejecting rotor 85, and the projected abrasive accumulates at the bottom of the cabinet 2 so that it can be recovered. Furthermore, the abrasive machine 10 includes water-supply means 7' for spraying water onto the abrasive accumulating at the bottom of the cabinet 2 to maintain the water content of the abrasive (Japanese Unexamined Patent Publication No. 2003-211359).

The above-mentioned '359 application also describes that a test piece is subjected to preparatory polishing without supplying water to measure a decrease in the volume of water in the abrasive over a certain period of time so that water is additionally supplied based on the result of the measurement.

Physical properties, such as the hardness and the elasticity, of the above-described elastic abrasive greatly change depending on the water content. More specifically, the elastic abrasive exhibits desired elasticity when a sufficient volume of water is contained, but becomes harder and more brittle as the water content decreases.

As described above, when water evaporates from the elastic abrasive and the hardness of the elastic abrasive is increased, it becomes more difficult for the abrasive to slide on the surface of the workpiece, or the abrasive bounces off, rather than sliding on the workpiece surface. It causes the surface of the workpiece to become a satin-like finish, which greatly affects the glossiness and the workability of the surface of the processed workpiece. In the case, the elastic abrasive becomes more brittle and the recovery rate of the abrasive decreases.

On the other hand, for the invention disclosed in the above-described '359 application, water is sprayed to the abrasive accumulated at the bottom of the cabinet 2 by using the water-supply means 7' to replenish the dry abrasive with water. Thus, the invention in the above-described '359 application can be expected to have a certain level of effectiveness against a change in the workability or a decrease in a recovery rate resulting from curing of the abrasive resulting from drying of the abrasive.

It should be noted, however, that the abrasive accumulated at the bottom of the cabinet 2 is large in amount and many layers of the abrasive are deposited one on another in a lump. Therefore, the abrasive may remain in a lump even though the abrasive is stirred somewhat while it is being transported upward by means of the conveyor belt 97. Thus, water sprayed from above onto this solidified abrasive cannot satisfactorily reach the lower layers of the abrasive though such water may reach the upper layers of the abrasive.

What is worse, if a large volume of water is supplied to sufficiently replenish the lower layers of the abrasive with water, the upper layers of the abrasive will be saturated with water. If such abrasive saturated with water is ejected onto a workpiece, the workpiece will be contaminated with water adhering to it. In addition, for blasting machines in which the abrasive is ejected together with a compressed gas, the abrasive in the form of particles aggregated due to water, resulting in relatively large secondary particles, will cause clogging in a blasting gun for ejecting the abrasive.

Furthermore, since the abrasive is ejected onto the workpiece in a state where flexible, a highly elastic abrasive replenished with a sufficient volume of water is mixed with dry, hard, and a brittle abrasive failing to absorb a sufficient volume of water, each component of the abrasive is bombarded on the workpiece surface in different states. Thereby, an expected processing state cannot be achieved, and therefore, the quality of processed products decreases and the defective fraction increases.

In order to supply an optimal volume of water, the invention in the above-described '359 application also discloses the process of measuring a decrease in the volume of water during preparatory polishing to determine the volume of additional water based on the obtained data for the decrease in volume of water.

According to the method, the volume of evaporating water needs to be determined by, for example, obtaining all amounts of the abrasives in the cabinet 2 before and after preparatory polishing and then measuring a change in weight between before and after the preparatory polishing. Not only is the work extremely complicated but also machine operation needs to be suspended during the measurement.

Furthermore, although it is always expected that an optimal amount of water is supplied according to the volume of evaporating water obtained through preparatory polishing, the volume of water evaporating from the abrasive differs at different times depending on various conditions, such as ejection conditions of the abrasive, the shape of the workpiece, and the temperature. In particular, for blasting in which the abrasive is ejected in a state of a mixed fluid containing a compressed gas, such as air, argon, or nitrogen, the volume of evaporating water also changes depending on the components, pressure, temperature, and so forth of the compressed gas with which the abrasive is ejected.

For the reason, in order to allow many processed objects (i.e., workpieces) of the same material and the same shape to always have processing results of constant quality, the water supply amount needs to be adjusted as appropriate according to changes in various conditions during blasting.

However, in the method disclosed in the above-described '359 application, there is no way for acquiring data required for water volume adjustment during blasting. In other words, an excessive or insufficient volume of water may be supplied, which increases the defective fraction.

For the elastic abrasive described in the two other documents mentioned above, the carriers of the abrasive grains are formed of a porous member of natural vegetable fibers or gelatin, and the abrasive grains are carried on the surfaces of the carriers by an adhesive force of water contained in these carriers. Consequently, when the adhesive force is lost due to drying, some abrasive grains fall out, and therefore, the cutting force decreases.

Furthermore, even in a state where a sufficient volume of water is contained, once the abrasive carried on the surfaces falls out, the cutting force cannot be recovered. Moreover, when burrs or cut powders generated during processing adhere to the abrasive surface by the adhesive force of the carriers, they add to the cutting force of the abrasive grains. For the reason, the surface of the workpiece may be cut more than expected, failing to produce a mirror-like finish, in other words, failing to process the workpiece to have a desired surface.

In view of these circumstances, the present invention has been conceived in order to overcome the problems associated with the above-described related art. More specifically, in a blasting method using the elastic abrasive that contains a certain amount of liquid to exhibit desired elasticity, the liquid content of the individual abrasive to be ejected onto a workpiece is maintained uniform and constant. Thereby, an object of the present invention is to provide a blasting method and a blasting machine for realizing the method in which variations in quality can be prevented, and consequently, the defective fraction can be reduced even when many workpieces are sequentially processed.

Another object of the present invention is to provide a blasting method and a blasting machine capable of adjusting the volume of supplied liquid according to a change in evaporation rate of the liquid impregnated into the abrasive resulting from a change in processing conditions, thereby supplying an optimal amount of liquid.

Still another object of the present invention is to provide a blasting method capable of processing a workpiece with desired high processing accuracy by the use of the elastic abrasive which can prevent the cutting force from changing for various reasons, such as abrasive grains falling off or adhesion of burrs and cut powders generated during blasting to the workpiece surface.

SUMMARY OF THE INVENTION

In the following explanation of the Summary, reference numerals are referred as of the Embodiment in order to easily read the present invention, however, these numerals are not intended to restrict the invention as of the Embodiment.

To achieve the above-mentioned object, a blasting method according to the present invention used in a blasting process including an abrasive circulatory system from a blasting gun 8 to an abrasive-recovery tank 3, in which:

an abrasive is ejected together with a compressed gas from the blasting gun 8 in a blasting chamber 21 in a cabinet 2, the blasting chamber 21 having a lower part thereof formed in a hopper shape;

negative pressure is caused in the abrasive-recovery tank 3 by the effect of an air flow generated by a ventilator 6 for sucking air in the abrasive-recovery tank 3 communicating with a bottom of the blasting chamber 21;

the abrasive in the blasting chamber 21 is recovered into the abrasive-recovery tank 3 by the effect of the negative pressure; and the abrasive recovered into the abrasive-recovery tank 3 is supplied to the blasting gun 8 by using abrasive-supply means, is characterized by comprising the steps of:

spraying liquid in an air flow for transporting the abrasive by using liquid-supply means 7 in the abrasive circulatory system; and ejecting the abrasive sprayed with the liquid onto a surface of a workpiece W at an acute incident angle, wherein the abrasive is the one which contains a certain amount of liquid to exhibit desired elasticity (elastic abrasive).

A blasting machine according to the present invention is characterized by comprising:

a cabinet 2 containing a blasting chamber 21 having a lower part thereof formed in a hopper shape;

a blasting gun 8 for ejecting an abrasive together with a compressed gas in the blasting chamber 21;

a cyclone abrasive-recovery tank 3 communicating with a bottom of the blasting chamber 21;

a ventilator 6 for sucking air in the abrasive tank;

abrasive-supply means for supplying a reusable abrasive recovered into the abrasive-recovery tank 3 to the blasting gun 8; and an abrasive circulatory system in which the abrasive ejected from the blasting gun 8 is recovered into the abrasive-recovery tank 3 by negative pressure caused by the ventilator 6 and the recovered abrasive is supplied to the blasting gun 8, wherein liquid-supply means 7 for spraying a predetermined liquid in an air flow for transporting the abrasive is provided in the abrasive circulatory system.

In the blasting method, the step of spraying the liquid is preferably carried out by using the liquid in the form of droplets with a mean diameter of 10 μm or less. It is preferable that droplets with the above-mentioned mean diameter are sprayed from a spray nozzle 72 of the liquid-supply means 7.

The step of spraying the liquid by the liquid-supply means 7 is carried out in an abrasive-recovery duct 91 communicating between the cabinet 2 and the abrasive-recovery tank 3 and/or in the abrasive-recovery tank 3, thereby the abrasive in the form of a three-phase mixed fluid composed of a gas, a liquid, and a solid, serving as the abrasive is transported in the abrasive-recovery duct 91 and/or in the abrasive-recovery tank 3.

The step of spraying the liquid by the liquid-supply means 7 may be carried out to a compressed gas before being introduced into the blasting gun 8 to eject the abrasive in the form of a three-phase mixed fluid composed of a compressed gas, a liquid, and a solid, serving as the abrasive, from the blasting gun 8.

The amount of the liquid sprayed through the liquid-supply means 7 may be variable. In this case, the blasting method according to the present invention may further comprises:

providing a plurality of workpieces W1, W2 and Wn such as test pieces with the same material, the same shape, and substantially the same processed surface;

blasting the workpiece W1 with an abrasive containing a certain amount of liquid;

acquiring a surface reflectance R, serving as a reference surface reflectance R1, after the blasting is completed;

blasting the other workpiece W2 (, Wn) with an abrasive containing an unknown amount of liquid;

measuring a surface reflectance R2 (, Rn) after the blasting is completed and comparing the measurement with the reference surface reflectance R1; and controlling an amount of the liquid sprayed so that the surface reflectance measured on the other workpiece W2 becomes close to the reference surface reflectance R1.

In such blasting machine 1 may further comprise:

surface-reflectance measuring means 16 for measuring a surface reflectance of a processed workpiece W; and a controller 15 for comparing the surface reflectance measured by the surface-reflectance measuring means 16 with a reference surface reflectance, which is a surface reflectance R2 (, Rn) acquired from the workpiece W1 processed by using the abrasive containing a certain amount of liquid, to control an amount of liquid sprayed by the liquid-supply means 7 so that the measured surface reflectance R2 (, Rn) becomes close to the reference surface reflectance R1, wherein, the amount of the liquid sprayed by the liquid-supply means 7 is variable.

The blasting method according to the present invention may further comprises:

providing a blasting machine 1 with a stirring vane 34 that stirs the abrasive recovered at a bottom of the abrasive-recovery tank 3 and a motor 35 that rotates the stirring vane 34;

acquiring, as a reference electrical-current value A1, an electrical-current value A of the motor 35 measured when stirring an abrasive S1 containing a certain amount of liquid in the abrasive-recovery tank 3;

blasting the other abrasive S2; and measuring the electrical-current value A2 (, An) of the motor 35 while the blasting using the other abrasive S2 and comparing the measured electrical-current value A2 (, An) with the reference electrical-current value A1; and controlling an amount of the liquid sprayed so that the measured electrical-current value A2 (, An) becomes close to the reference electrical-current value A1.

In this case, the blasting machine 1 according to the present invention may further comprises:

electrical-current detecting means 17 for detecting a value of an electrical current flowing in the motor 35, and a controller 15 that compares the electrical current detected by the electrical-current detecting means 17 with a reference electrical-current value to control the amount of liquid sprayed by the liquid-supply means 7 so that the measured electrical-current value becomes close to the reference electrical-current value.

The amount of liquid sprayed may be controlled based on both the surface reflectance of the workpiece W and the electrical-current value of the motor 35 that rotates the stirring vane 34.

In the blasting method according to the present invention, it is preferable to use the abrasive which is coagulated in gel by adding a coagulant to a pasty substance obtained by stirring and kneading a mixture of the abrasive grains in an amount of 5.0 to 50 times devil's tongue powders by weight and water in an amount of 30 to 50 times the devil's tongue powders by weight.

According to the above-described blasting method and blasting machine of the present invention, an elastic abrasive from which the liquid contained evaporates in the course of use can be uniformly supplied with liquid to maintain the desired elasticity, thereby eliminating variations in the processing accuracy.

Consequently, even though the elastic abrasive is repeatedly used, deterioration in the processing state, an increase in the defective fraction, and so forth arising from drying of the abrasive can be prevented.

In particular, according to the present invention, an air flow for transporting the abrasive is sprayed with the above-described liquid in the abrasive circulatory system formed in the blasting process and the blasting machine. With the structure, the abrasive is separated into individual particles while flying in the air flow. Therefore, each of the abrasive can be uniformly supplied with liquid. As a result, variations in water content among the abrasive to be ejected onto the workpiece can be eliminated. Therefore, a decrease in product quality resulting from the abrasive with different physical properties being ejected onto the workpiece can be prevented.

Since the liquid sprayed is formed of fine droplets with a mean diameter of 10 μm or less, such droplets are not crushed even when colliding with the inner wall of the abrasive-recovery duct 91, the abrasive-recovery tank 3, the blasting gun 8, etc. but bounce off the inner wall. Thus, the inner walls of the abrasive flow channels do not become wet. Therefore, the abrasive can be satisfactorily prevented from adhering to the interiors of flow channels, and hence, clogging can be suitably prevented.

Since the above-described liquid is sprayed in the abrasive-recovery duct 91 and/or the abrasive-recovery tank 3, mist in the form of fine droplets can be merged with a two-phase (solid and gas) mixed fluid composed of the abrasive and a transported gas. Thereby, liquid can be uniformly distributed among the abrasive.

Furthermore, when liquid is sprayed to a compressed gas before being introduced into the blasting gun 8, the liquid can be uniformly distributed among the abrasive for the same reason as described above. In addition, since a three-phase (gas, liquid, and solid) mixed fluid composed of a compressed gas, the above-described liquid, and the abrasive is ejected from the blasting gun 8, static electricity can be effectively suppressed in the blasting chamber 21 of the cabinet 2 due to the use of the elastic abrasive containing liquid components.

When the water content of the abrasive decreases, the workpiece processed with such abrasive has a satin-like finish; that is, the surface reflectance of the processed workpiece decreases. In terms of the phenomenon, an optimal amount of liquid according to the ever-changing volume of liquid evaporating from the abrasive can be supplied by controlling the amount of sprayed liquid so that the surface reflectance becomes close to the surface reflectance of the workpiece processed with the abrasive containing a predetermined amount of liquid (reference surface reflectance).

In particular, since the surface reflectance of the workpiece can easily be detected with the surface-reflectance detecting means 16, such as a reflectance optoelectronic sensor, and the detected surface reflectance can be converted into an electrical signal, the amount of liquid sprayed can easily be controlled automatically. Furthermore, the amount of liquid sprayed can be adjusted dynamically even while the blasting machine 1 is in operation.

When the liquid content in the elastic abrasive decreases, the elastic abrasive becomes light in weight, loses its elasticity, and is hardened. Consequently, the resistance occurred when the abrasive in the abrasive-recovery tank 3 is stirred decreases as the liquid evaporates. In terms of the phenomenon, since the ever-changing liquid content can easily be acquired by detecting an electrical-current value of the motor 35 that rotates the stirring vane 34 for stirring the abrasive, an optimal amount of liquid can always be sprayed by changing the spray amount based on a change in the electrical-current value.

In addition, since the spray amount is changed based on a change in electrical-current value of the electrical-current detecting means 17, the volume of liquid to be merged can easily be controlled automatically.

When a gelatinous abrasive obtained by adding a coagulant to the kneaded material of devil's tongue powders, abrasive grains, and water is to be used for the elastic abrasive, only a small amount of abrasive grains falls out even when liquid (water) evaporates. In addition, even though abrasive grains exposed on the surface fall out, the gelatinous part is worn away and internally dispersed abrasive grains are newly exposed, thereby maintaining the cutting force. Furthermore, due to the relatively low adhesiveness, abrasive powders or burrs do not easily carry on and a change in the cutting force arising from the type of carrying is not easily induced. This ensures a blasting method for processing with stable accuracy.

BRIEF DESCRIPTION OF THE DRAWINGS

The objects and advantages of the invention will become apparent from the following detailed description of preferred embodiments thereof provided in connection with the accompanying drawings in which.

DETAILED DESCRIPTION OF THE PREFERRED EMBODIMENTS

Embodiments according to the present invention will now be described with reference to the attached drawings.
Overall structure of a blasting machine The overall structure of a blasting machine used for a blasting method according to the present invention will be described with reference to FIGS. 1 and 2.

Figure 1:
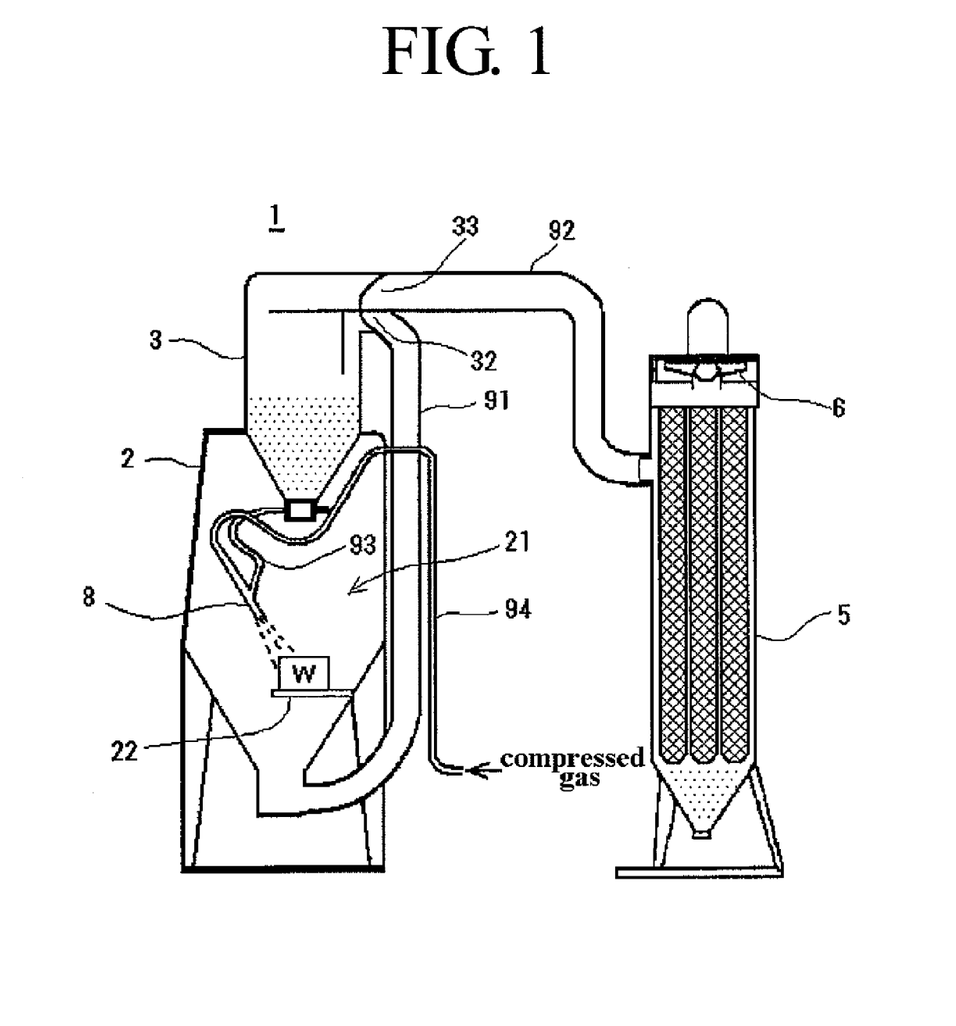
FIG. 1 is a schematic illustration of a blasting machine (suction type)

A blasting machine 1 shown in FIG. 1 is a so-called "suction-type" blasting machine which includes an abrasive-supplying conduit 93 communicating with an abrasive-recovery tank 3 and a compressed-gas supply conduit 94 communicating with a compressed-gas supply source (not shown) such that the abrasive-supplying conduit 93 is combined with the compressed-gas supply conduit 94 in a blasting gun 8. With the help of negative pressure in the abrasive-supplying conduit 93 generated by a compressed gas, such as air, argon, or nitrogen (compressed air in the embodiment) introduced through the compressed-gas supply conduit 94, the abrasive from the abrasive-recovery tank 3 is merged in the blasting gun 8 with the compressed gas so that the mixture of the abrasive and the compressed gas is ejected from the blasting gun 8. The blasting machine 1 includes a cabinet 2 accommodating a blasting chamber 21 which contains the blasting gun 8 and a workpiece W to carry out blasting, the cyclone abrasive-recovery tank 3 for separating and recovering the abrasive ejected in the blasting chamber 21, and a ventilator 6 for sucking, through a dust collector 5, exhaust air generated after the abrasive has been removed in the abrasive-recovery tank 3.

Figure 2:
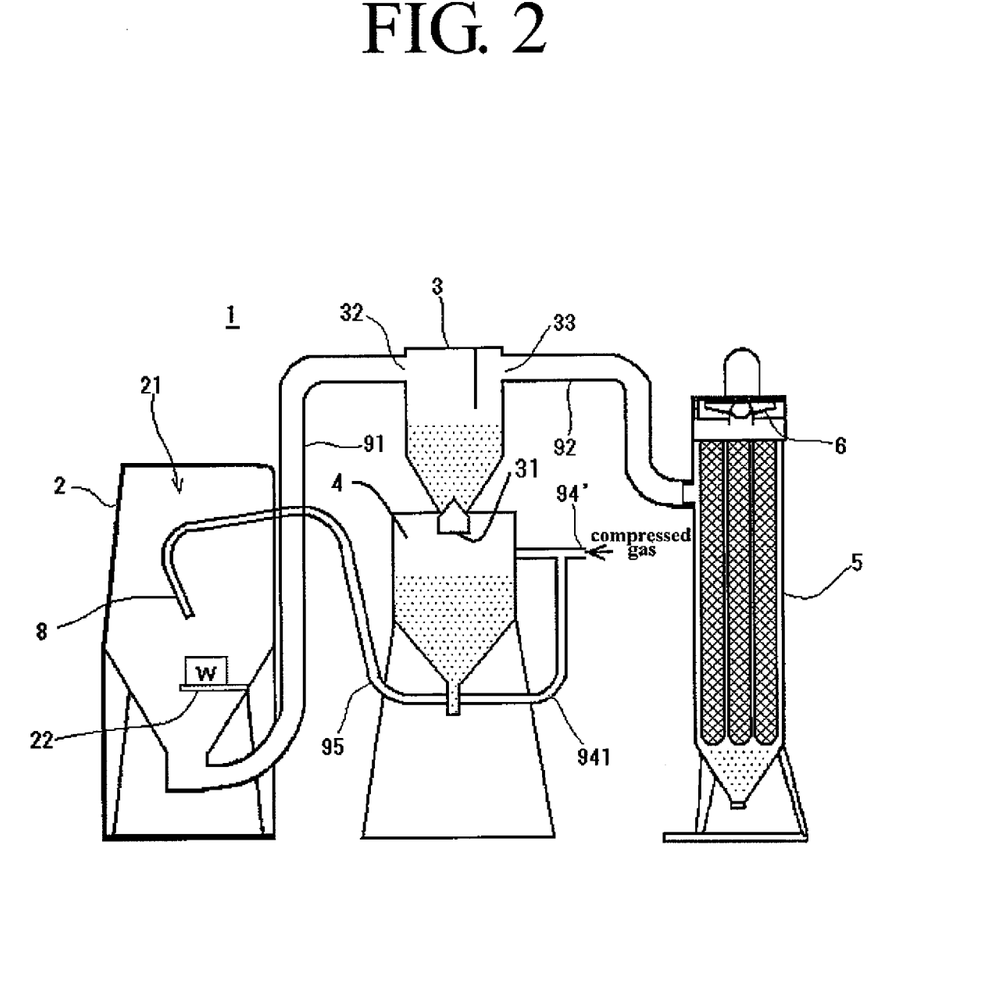
FIG. 2 is a schematic illustration of a blasting machine (direct-pressure type)

The blasting machine 1 shown in FIG. 2 is a so-called "direct-pressure type" blasting machine in which the abrasive delivered into a pressurized abrasive-pressurizing tank 4 is ejected together with a compressed gas. In the blasting machine 1 described with reference to FIG. 1, the abrasive recovered by the abrasive-recovery tank 3 is supplied directly to the blasting gun 8. In contrast, in the direct-pressure type blasting machine 1 shown in FIG. 2, a lower part of the abrasive-recovery tank 3 for recovering the abrasive is made to communicate with the above-described abrasive-pressurizing tank 4 via a dump valve 31, an amount of the abrasive equivalent to one ejection is made to fall into the abrasive-pressurizing tank 4 by opening/closing the dump valve 31, the abrasive is pumped from the abrasive-pressurizing tank 4 with the help of a compressed gas introduced into the abrasive-pressurizing tank 4 from a compressed-gas supply source, the pumped abrasive is introduced into an abrasive-pumping conduit 95 in the flow of another compressed gas introduced via a branched conduit 941 from the compressed-gas supply source, and the abrasive is sent to the blasting gun 8 mounted at a leading end of the abrasive-pumping conduit 95 and is ejected onto the workpiece W.

As described above, in the direct-pressure type blasting machine 1 shown in FIG. 2, the method of ejecting the abrasive that has been recovered into the abrasive-recovery tank 3 differs from that employed by the suction-type blasting machine 1 described with reference to FIG. 1. However, the direct-pressure type blasting machine 1 shown in FIG. 2 is similar to the blasting machine 1 described with reference to FIG. 1 in that the method of recovering the abrasive that has been ejected and the abrasive circulatory system in which the abrasive that has been ejected is recovered for re-ejection.

The following description mainly focuses on the suction-type blasting machine 1 shown in FIG. 1, and the structure of the direct-pressure type blasting machine will be referred to only when differences from the suction-type blasting machine need to be described.

The above-described blasting machine 1 includes the cabinet 2 accommodating the blasting chamber 21 in which the blasting gun 8 is disposed. The abrasive is ejected onto the surface of the workpiece W placed in the blasting chamber 21 to carry out desired blasting. The cabinet 2 has, on the front wall thereof, an operating hole (not shown in the figure) through which an operator inserts his/her hand into the above-described blasting chamber 21 so that the operator can perform various operations in the blasting chamber 21 and a viewport (not shown in the figure) fitted with a transparent plate, such as a plate glass, for checking, for example, a processing state of the workpiece during operation.

On the front wall, an openable/closable door (not shown in the figure) is further provided so that the workpiece W can be transported into or taken out of the blasting chamber 21 by opening/closing the openable/closable door.

The blasting chamber 21 is formed in a hopper shape, i.e., a substantially vertically inverted trapezoid (in sectional view) tapering downwards so that the ejected abrasive and generated dust can be accumulated at a lower part the blasting chamber 21. The lowermost end portion of the blasting chamber 21 is connected to an abrasive-recovery duct 91 for introducing the abrasive ejected from the blasting gun 8 and/or dust resulting from the abrasive colliding with the workpiece into the abrasive-recovery tank 3 (described later).

The above-described abrasive-recovery tank 3 is a cyclone tank. In the example shown in FIG. 1, the abrasive is supplied to the blasting gun 8 which is disposed in the blasting chamber 21 of the cabinet 2 and then accelerated and ejected with compressed air supplied from a compressed-air supply source (not shown in the figure), thus bombarded on the workpiece W.

The abrasive-recovery tank 3 provided at an upper portion of the blasting chamber 21 functions as a cyclone, as described above. The abrasive-recovery tank 3 is connected to the ventilator 6 via the dust collector 5 by linking the abrasive-recovery duct 91 communicating with the lower end of the blasting chamber 21 to an inlet 32 and by linking a dust-collecting duct 92 communicating with the dust collector 5 (described later) to an exhaust port 33.

In the embodiment, the dust collector 5 can collect dust by means of a bag filter. When the ventilator 6 mounted at an upper end of the dust collector 5 is driven to eject air from the dust collector 5, dust contained in the air flow that has been introduced into the dust collector 5 is caught by a filter and recovered at the bottom of the dust collector 5. Thus, only air purified through, for example, the filter is ejected.

Reference numeral 22 denotes a table on which the workpiece W is disposed, and blasting can be applied to the workpiece W disposed on the table 22.

Abrasive Circulatory System in the Blasting Machine

In the blasting machine 1 with the above-described structure, when the ventilator 6 mounted on the dust collector 5 is driven, air in the dust collector 5 is ejected and negative pressure is produced in the dust collector 5.

The negative pressure in the dust collector 5 generates air flowing from the blasting chamber 21 in the cabinet 2 to the abrasive-recovery tank 3 and to the dust collector 5.

The air flow causes the abrasive ejected together with a compressed gas from the blasting gun 8 in the blasting chamber 21 to fly along the abrasive-recovery duct 91 communicating with the bottom of the blasting chamber 21 and to be introduced into the abrasive-recovery tank 3. The abrasive then flies and swirls in a swirling flow generated in the abrasive-recovery tank 3, thereby allowing reusable abrasive to accumulate at the lower part of the abrasive-recovery tank 3.

On the other hand, the abrasive suffering wear, cracking, breakage, or the like and dust and the crushed abrasive ejected through the above-described exhaust port 33 and introduced into the dust collector 5 along with air flow containing dust, such as cut powders of the workpiece, are filtered through the dust collector 5 and only purified air is ejected outside the machine through the ventilator 6.

In the suction-type blasting machine shown in FIG. 1, a reusable abrasive recovered into the abrasive-recovery tank 3, as described above, is transported from the bottom of the abrasive-recovery tank 3 to the blasting gun 8 by the effect of the negative pressure generated in the abrasive-supplying conduit 93 by a compressed gas introduced into the blasting gun 8. The reusable abrasive then merges with the compressed gas in the blasting gun 8 and is ejected from the blasting gun 8. In the manner, an abrasive circulatory system including the blasting chamber 21, the abrasive-recovery tank 3, and the blasting gun 8 is formed.

In the direct-pressure type blasting machine 1 shown in FIG. 2, when the amount of the abrasive equivalent to one ejection falls from the abrasive-recovery tank 3 into the abrasive-pressurizing tank 4 disposed below the abrasive-recovery tank 3 by operating the dump valve 31 which opens/closes between the abrasive-recovery tank 3 and the abrasive-pressurizing tank 4, the abrasive in the abrasive-pressurizing tank 4 is pumped by a compressed gas introduced from the compressed-gas supply source (not shown in the figure) into the abrasive-pressurizing tank 4 and is discharged from the bottom of the abrasive-pressurizing tank 4. Thereafter, the abrasive merges with a compressed gas supplied from the compressed-gas supply source (not shown in the figure) and reaches the blasting gun 8. In the manner, the abrasive is circulated via the same route as the abrasive ejected in the blasting chamber 21.

Therefore, in the above-described blasting machine 1, air flow for transporting the abrasive occurs in the abrasive-recovery duct 91 serving as an abrasive recovery route, and the abrasive-recovery tank 3. For the suction-type blasting machine 1 shown in FIG. 1, a compressed gas from the compressed-gas supply source functions as air flow for transporting abrasive in the blasting gun 8. On the other hand, for the direct-pressure type blasting machine 1 shown in FIG. 2, a compressed gas from the compressed-gas supply source functions as air flow for transporting the abrasive in the route from the lower end of the abrasive-pressurizing tank 4 to the blasting gun 8.

Liquid-supply Method and Liquid-supply Means

As described above, the abrasive circulatory system is formed in the blasting machine 1. There is also provided liquid-supply means 7 for spraying a liquid, such as water, alcohol (e.g., methyl alcohol, ethyl alcohol), or a surfactant, to endow the elastic abrasive with a certain level of elasticity by swelling the elastic abrasive in the abrasive-transporting air flow in the abrasive circulatory system.

In the embodiment, in which the elastic abrasive formed of devil's tongue powders (described later) as an ingredient is used, water is employed as the liquid.

Liquid spraying by the liquid-supply means 7 is carried out along an air flow for transporting the abrasive in the above-described abrasive circulatory system. For example, liquid spraying can be carried out along one or more of the air flow in the abrasive-recovery duct 91 communicating with the lower part of the blasting chamber 21, the swirling flow generated in the abrasive-recovery tank 3, and the compressed gas before being supplied to the blasting gun 8.

Figure 3:
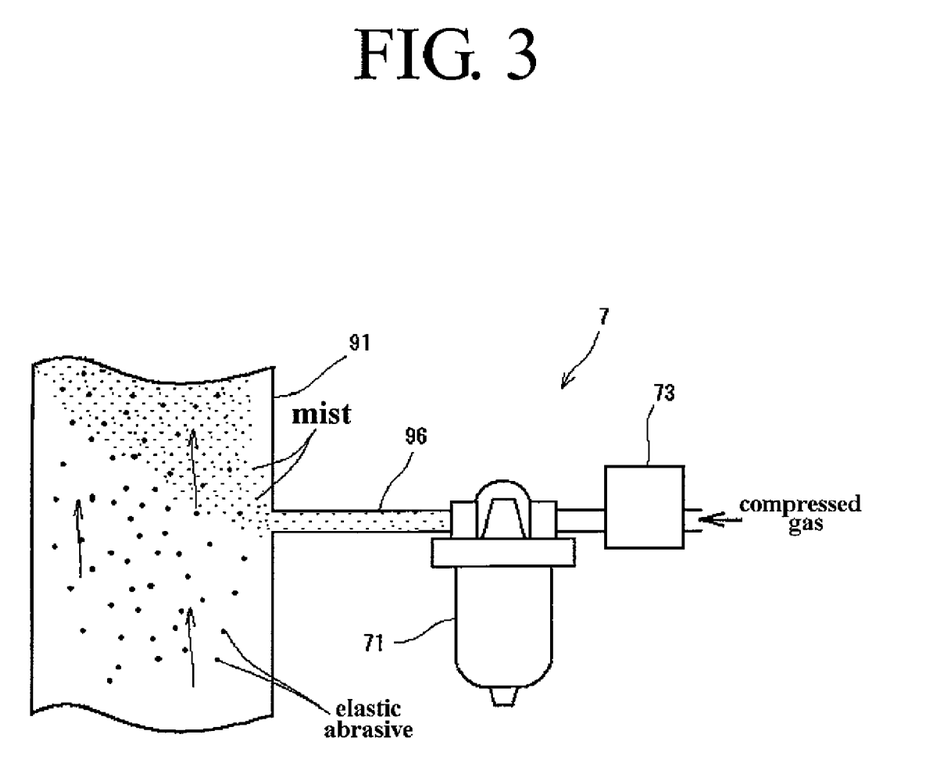
FIG. 3 is a schematic illustration depicting a constitutional example of liquid-supply means.

Liquid spraying may be carried out by any known means, as long as a predetermined liquid can be sprayed to the above-described air flows. For example, the liquid-supply means 7 can be constructed as follows. Referring to FIG. 3, a conduit 96 for introducing a compressed gas into the abrasive-recovery duct 91 from the same compressed-gas supply source as the one supplying a compressed gas to the blasting gun 8 or from a separately provided compressed-gas supply source is provided. Further, a lubricator 71 is provided in the conduit 96, and water is stored in a vessel of the lubricator 71. Thus, water in the vessel is sprayed by the pressure of the compressed gas flowing in the conduit 96 and is dispersed together with the compressed gas in the above-described abrasive-recovery duct 91.

Instead of the abrasive-recovery duct 91 shown in FIG. 3, the conduit 96 may be made to communicate with the abrasive-recovery tank 3 to spray liquid in the swirling flow occurring in the abrasive-recovery tank 3. Furthermore, when liquid is sprayed to a compressed gas before being supplied to the blasting gun, the lubricator 71 having water stored in the vessel thereof may be provided in a conduit (e.g., the compressed-gas supply conduit 94 in FIG. 1 or the branched conduit 941 in FIG. 2) extending from the compressed-gas supply source to the blasting gun 8 to spray liquid in the compressed gas before being supplied to the blasting gun 8.

Figure 4:
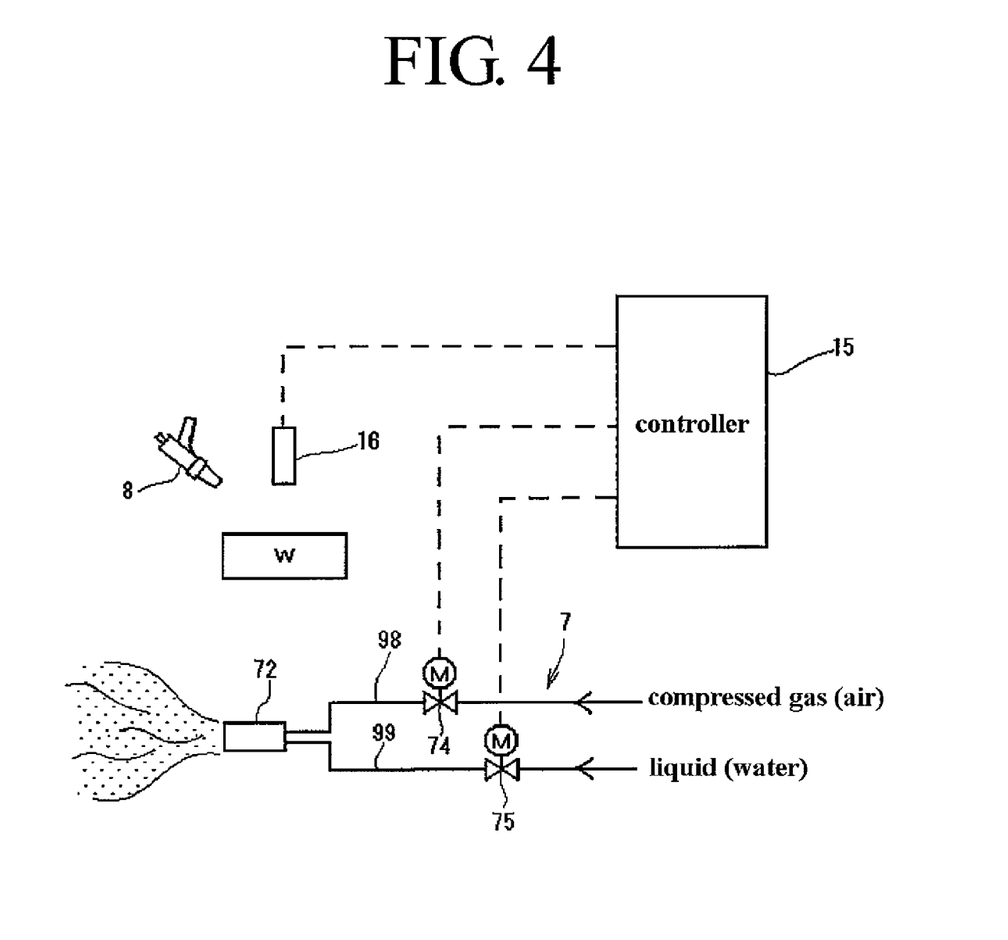
FIG. 4 is an illustration of a unit for automatic control of an amount of liquid sprayed.
Figure 5:
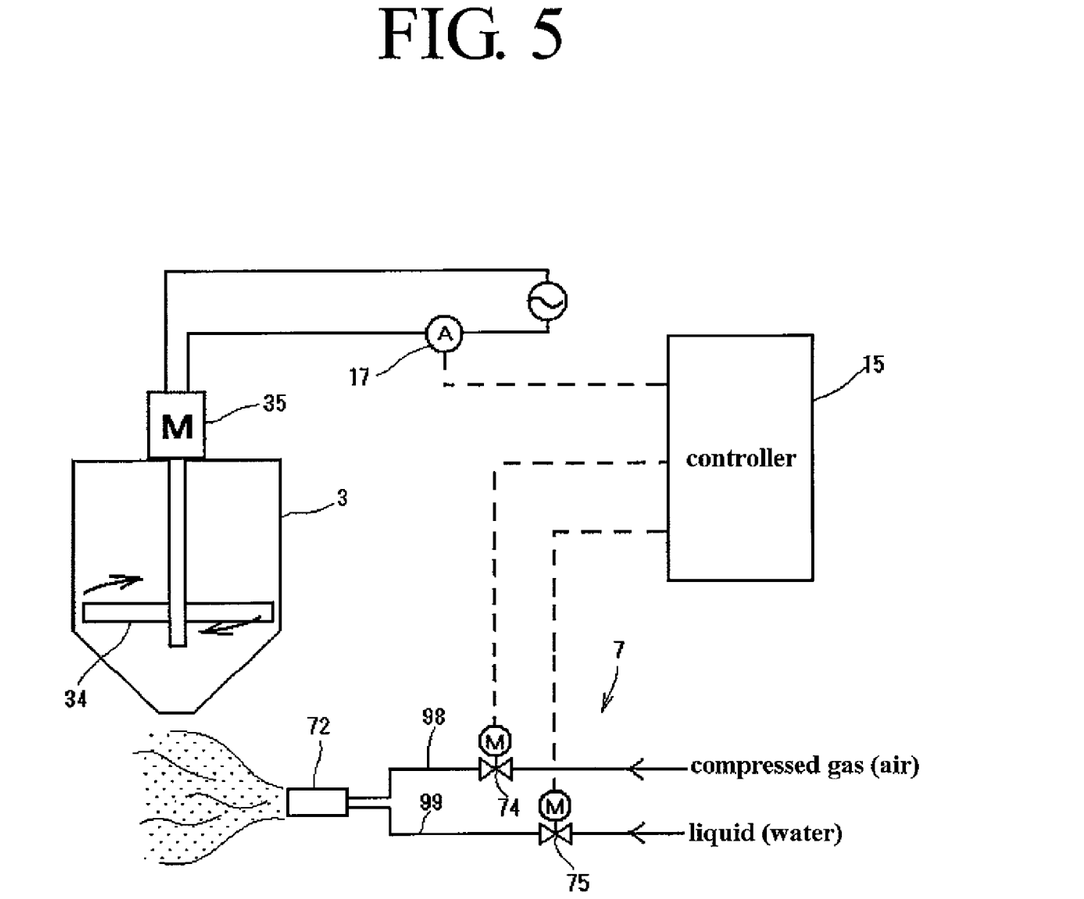
FIG. 5 is an illustration of another unit for automatic control of an amount of liquid sprayed.
Figure 6:
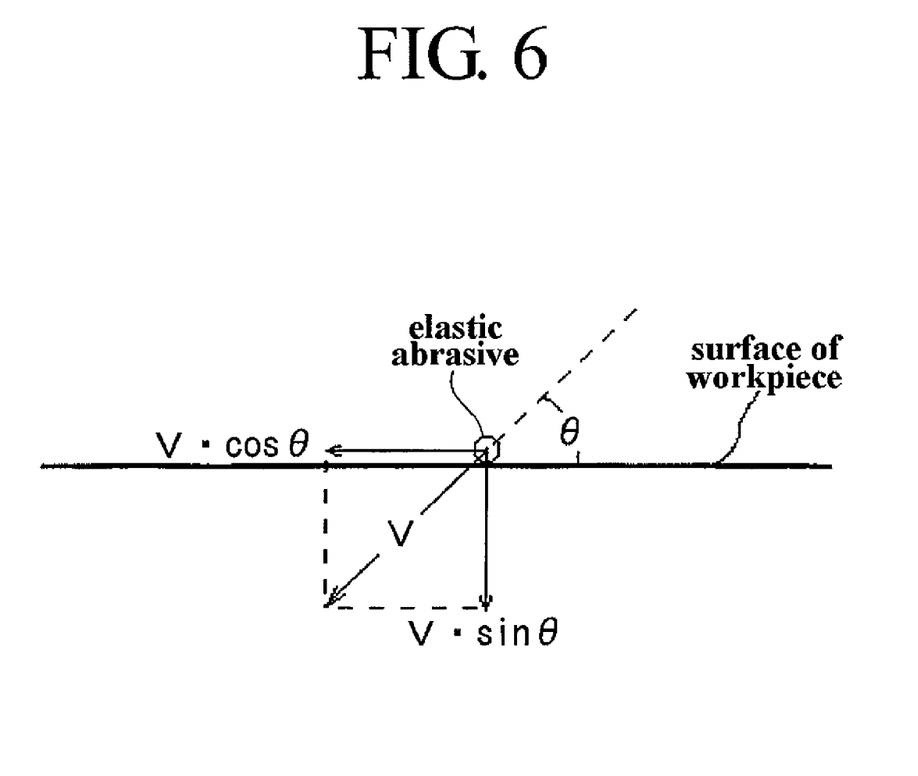
FIG. 6 is an illustration of components of a force applied to the abrasive bombarded on the processing surface of a workpiece.

Another structure of the liquid-supply means 7 may be realized by providing conduits 98 and 99 for introducing a compressed gas into a spray nozzle 72 from the compressed-gas supply source (not shown in the figure) as well as water from a water supply source, such as water produced by filtering water from municipal waterworks, as shown in FIGS. 4 and 5, and the above-described spray nozzle 72 of the liquid-supply means 7 may be provided in the abrasive-recovery duct 91 and/or the abrasive-recovery tank 3. Furthermore, a humidity-adjusting tank (not shown in the figure) may be provided in a conduit (the compressed-gas supply conduit 94 in FIG. 1 or the branched conduit 941 in FIG. 2) extending from the compressed-gas supply source to the blasting gun 8, and the above-described spray nozzle 72 may be provided in the humidity-adjusting tank to adjust the humidity of the compressed gas before being introduced into the blasting gun 8.

Spray Amount Control

The above-described liquid-supply means 7 is preferably capable of adjusting the amount of liquid sprayed. Thereby, the amount of liquid sprayed can be adjusted according to, for example, a change in blasting conditions so that an optimal amount of liquid can be supplied to the elastic abrasive.

For the constitutional example of the liquid-supply means 7 described with reference to FIG. 3, such adjustment of the amount of liquid sprayed may be realized by providing a variable-throttle flow-rate adjusting valve 73 on a primary side of the lubricator 71 and controlling the flow rate of a compressed gas passing through the lubricator 71 by the operation of the flow-rate adjusting valve 73.

Also in the case of the embodiments shown in FIGS. 4 and 5, a variable-throttle flow-rate adjusting valve 75 may be provided in the water supply conduit 99 for supplying liquid (water) to the spray nozzle. Further, in addition to the above-described water supply conduit 99, a variable-throttle flow-rate adjusting valve 74 may be provided in the conduit 98 for supplying a compressed gas to the above-described spray nozzle 72. In the manner, the amount of liquid sprayed from the spray nozzle 72 may be adjusted by the operation of these flow-rate adjusting valves 74 and 75.

According to the embodiment, where the amount of liquid sprayed by the liquid-supply means 7 can be controlled automatically, the above-described variable-throttle flow-rate adjusting valves 73, 74, and 75 are realized by a proportional solenoid valve which can perform throttle-opening adjustment according to an input electrical signal or by an electronic control device where the throttle can be varied using a servomotor. In the case, the above-described flow-rate adjusting valves 73 to 75 can be controlled according to a control signal from control means (controller) 15 for outputting a predetermined control signal based on a pre-stored program.

The controller 15 controls the amount of liquid sprayed by the above-described liquid-supply means 7 based on detection signals from various types of detecting means. In the embodiment shown in FIG. 4, when the elastic abrasive contains a sufficient amount of liquid, the elastic abrasive ejected onto the surface of the workpiece W at an acute incident angle slides on the surface of the workpiece W to process the surface to a mirror-like finish or a smooth surface, thus causing the surface reflectance of the workpiece W to become high. In contrast, when the elastic abrasive becomes dry and hard, the surface of the workpiece W becomes a satin-like finish, thus decreasing the surface reflectance. In light of the phenomenon, surface-reflectance detecting means 16, such as a reflectance optoelectronic sensor, is provided in the blasting chamber 21 so that the spray amount can be adjusted by controlling the flow-rate adjusting valves 74 and 75 of the liquid-supply means 7 based on a detection signal of the surface-reflectance detecting means 16.

In order to carry out such control of the spray amount, the following method may be employed. That is, blasting is carried out on a test piece, such as a mirror plate, under predetermined processing conditions by using the elastic abrasive having a predetermined water content, the surface reflectance detected with the test piece is preset as a reference surface reflectance, blasting is carried out on the same test piece under the same processing conditions at predetermined intervals while the blasting machine is in continuous operation, the surface reflectance is measured using the surface-reflectance detecting means 16, and the liquid-supply means 7 is controlled based on a control signal from the controller 15 so that the measured surface reflectance becomes close to the preset reference surface reflectance. With the above-described method, when the liquid content of the elastic abrasive decreases, the measured surface reflectance also decreases relative to the reference surface reflectance, and therefore, the amount of liquid sprayed can be increased.

When a large number of workpieces W of the same material and the same shape are to be sequentially processed, the following method may be employed. That is, the surface reflectance acquired by measuring one of the workpieces W that has been subjected to blasting using the elastic abrasive having a predetermined water content is set as the above-described reference surface reflectance. Thereafter, each time blasting of one of the workpieces W is completed or each time blasting of a predetermined number of workpieces W is completed, the surface reflectance of the workpiece W subjected to blasting is measured, and the controller 15 controls the liquid-supply means 7 so that the measured surface reflectance becomes close to the above-described reference surface reflectance, thus adjusting the amount of liquid sprayed.

Furthermore, in the embodiment shown in FIG. 5, a stirring vane 34 for stirring the elastic abrasive accumulated at the bottom of the abrasive-recovery tank 3 to prevent aggregation of such elastic abrasive is provided in the abrasive-recovery tank 3, as well as a motor 35 for rotating the stirring vane 34. When the elastic abrasive becomes dry and hence light in weight, the elastic abrasive loses its elasticity and is hardened. As a result, the rotational resistance of the stirring vane 34 decreases, and therefore, the value of an electrical current flowing in the motor 35 changes according to a change in the resistance. In light of the structure, electrical-current detecting means 17 for detecting the electrical-current value of the above-described motor 35 is provided. Thereby, the electrical-current value acquired when the elastic abrasive having a predetermined water content in the abrasive-recovery tank 3 is stirred is preset as a reference electrical-current value, the electrical-current value of the above-described motor is monitored with the electrical-current detecting means 17 while the blasting machine 1 is in operation, and the controller 15 controls the amount of liquid sprayed by the liquid-supply means 7 so that the electrical-current value of the motor detected by the electrical-current detecting means 17 becomes close to the above-described reference electrical-current value.

In short, when the elastic abrasive becomes dry and light in weight and hence loses its elasticity, the rotational speed of the stirring vane 34 decreases due to a decrease in contact resistance resulting from the decrease in weight and loss of elasticity. Consequently, since the load on the motor 35 decreases, the value of an electrical current flowing in the motor 35 increases.

Thus, when a high electrical-current value is detected relative to the reference electrical-current value, the amount of liquid sprayed by the liquid-supply means 7 is increased to prevent the elastic abrasive from becoming dry. In contrast, when a low electrical-current value is detected relative to the reference electrical-current value, the spray amount is decreased to prevent excessive water supply.

Elastic Abrasive

General Elastic Abrasive

According to the blasting method of the present invention adopted by the above-described blasting machine 1, various types of elastic abrasives that exhibit the desired elasticity by containing a predetermined amount of water or another liquid can be used. Known types of the elastic abrasive described as the related arts, can also be used: e.g., the elastic abrasive formed by carrying on abrasive powders (abrasive grains) to an elastic porous carrier made of a plant-based ingredient ('468 application) and the elastic abrasive formed by adhering abrasive grains onto a carrier (core) made of gelatin containing an evaporation-preventing agent depending on an adhesive force of the water contained in the carrier (Japanese Patent No. 3376334).

In the embodiment, the elastic abrasive which is coagulated in gel by adding a coagulant to a pasty substance obtained by stirring and kneading a mixture of the abrasive that is 5.0 to 50 times devil's tongue powders by weight and water that is 30 to 50 times the devil's tongue powders by weight is used. The elastic abrasive is characterized in that adhesiveness when water is contained is low compared with the above-described known elastic abrasive, and therefore, burrs and/or cut powders or the like removed during blasting do not easily carry on the surface; and since gelatinous material is kneaded with abrasive grains such that the abrasive grains are dispersed in the gelatinous material, the internal abrasive grains are exposed on the surface when the gelatinous material is worn away, thereby preventing the cutting force from decreasing even though abrasive grains on the surface fall out.

Devil's tongue powders, serving as the ingredient of the elastic abrasive, can be formed into a gelatinous material by mixing the devil's tongue powders with water, kneading and allowing the mixture to swell, and then adding alkali chemicals (e.g., calcium hydroxide, wood ash, eggshell calcium), serving as a coagulant. Although the gelatinous material obtained in the manner is insoluble in water, it exhibits elasticity when containing a large volume of water. By ejecting the elastic abrasive formed by kneading the elastic material with abrasive grains onto a workpiece at an acute incident angle, the elastic abrasive slides on the surface of the workpiece to process the surface to a mirror-like finish or a smooth surface without forming irregularities.

Water in an amount 30 to 50 times the devil's tongue powders by weight is prepared, and most preferably, water in an amount 36 times the devil's tongue powders by weight is prepared. The mixing ratio of the abrasive grains to devil's tongue powders ranges from 1:5.0 to 1:50 by weight, and preferably 1:10 to 1:40 by weight. Furthermore, the volume of water is preferably 10% to 100% of the gross weight (100) including abrasive grains and devil's tongue powders (hereinafter, the ratio of water to the gross weight including abrasive grains and devil's tongue powders is referred to as the "water content"), and more preferably, the water content of the abrasive should be 20% to 80%.

If the water content of the elastic abrasive used is 10% or less, the binding state of devil's tongue is poor. In the case, the abrasive that has been ejected and processed will be crushed and cannot maintain its normal shape.

With a water content of 100% or more, water is discharged at the time of ejection, thereby causing the workpiece or the interior of the chamber to become wet. If the occurs, disadvantageously, the abrasive may adhere to the inner wall of the cabinet and cannot be circulated or ejected.

For the abrasive grains kneaded with the devil's tongue powders, their materials, shapes, dimensions, etc. are not particularly limited, but various types of abrasive grains can be used, provided that such abrasive grains can come into contact with the workpiece to process the workpiece into a desired state and can be dispersed in the above-described gelatinous material.

Various types of materials generally used as abrasive grains can be used. For example, the materials listed in Table 1 below can be used, including alumina, such as white alundum (WA) and alundum (A), green carborundum, diamond, c-BN, boride, carbon boride, titanium boride, cemented carbide, etc.

Furthermore, two or more of these materials may be mixed for use as abrasive grains.

TABLE 1

Examples of the Abrasive Grains Employed as the Abrasive of the Present Invention

| | |
|---|---|
| Plant-based | Corn core; seed hull of walnut, peach, nuts, apricot, etc.; pulp; cork |
| Metals | Iron, steel, cast iron, cobalt, nickel, gallium, zirconium, niobium, molybdenum, rhodium, palladium, silver, indium, tin, antimony, zinc, stainless steel, titanium, vanadium, chromium, aluminum, silicon, $MnO_2$, $Cr_2O_3$, or alloys thereof |

TABLE 1-continued

Examples of the Abrasive Grains Employed as
the Abrasive of the Present Invention

| | |
|---|---|
| Ceramics | Glass, quartz, alundum, white alundum, carborundum, green carborundum, zircon, zirconia, garnet, emery, carbon boride, titanium boride, aluminum-magnesium, boride, or boride nitride |
| Inorganic materials | Calcium carbonate, calcium sulfate, or calcium fluoride, barium sulfate, barium chloride, aluminum sulfate, aluminum hydroxide, strontium carbonate, strontium sulfate, strontium chloride, titanium oxide, basic magnesium carbonate, magnesium hydroxide, carbon, graphite, graphite fluoride, molybdenum disulfide, or tungsten disulfide |

The grain size of the above-described abrasive grain is not particularly limited but appropriate grain sizes can be selected according to, for example, the purpose of processing. For example, abrasive grains with a grain size of 1 mm to 0.1 μm can be used. Moreover, in cases where a mirror finish is applied by glossing the processing surface of the workpiece, the employment of fine abrasive grains with a mean grain diameter of no more than 6 μm (#2000 or greater) is preferable. In the abrasive grains used for the blasting method according to the present invention, fine abrasive grains with a mean grain diameter of no more than 1 μm (#8000 or greater) may be employed.

Moreover, in cases where the processing surface of a workpiece is to be cut and processed into a predetermined shape, rough abrasive grains with a mean grain diameter of no less than 30 μm (#400 or less) may be employed, or in the present invention, abrasive grains with a mean grain diameter of 1 mm may also be employed.

Although the abrasive grains may have up to approximately half the grain diameter thereof exposed, in such cases, the degree of exposure from the carrier of the abrasive grains is preferably 10% to 50% of the grain diameter thereof. With abrasive grains in which the degree of exposure is no more than 10%, the abrasive grain length involved in processing is reduced, so that the abrasive force thereof is reduced, and the working efficiency thereof is poor. With abrasive grains in which the degree of exposure is no less than 50%, the surface area of the abrasive grains carried on (embedded in) the carrier is reduced, which causes the retaining strength of the abrasive grains in the carrier to be reduced, so that the abrasive grains fall off the carrier during processing, thereby preventing processing uniformity from being maintained. Moreover, the durability of the abrasive is poor, and the cost is high. Accordingly, the degree of exposure is preferably from 20% to 40%.

The elastic abrasive with the above-described structure is ejected at an acute incident angle relative to the surface of the workpiece, as described above, and slides on the surface of the workpiece to process the surface to a mirror-like finish or a smooth surface without causing irregularities. In addition, since the elastic abrasive contains a large volume of water, no static electricity occurs when the elastic abrasive is bombarded on the surface of the workpiece. Also, since the elastic abrasive exhibits satisfactory elasticity, no dust occurs.

However, since devil's tongue powders, serving as an ingredient of the elastic abrasive, and gelatinous material (so-called "devil's tongue") produced by swelling the devil's tongue powders with water and coagulating the resultant mixture are natural dietary fibers and contain water, the elastic abrasive with the structure tends to deteriorate due to mould or putrefaction. For the reason, an optimal amount of antiseptic may be supplied in addition to devil's tongue powders, abrasive grains, and water to prevent mould occurrence and deterioration due to putrefaction. In the case, for the antiseptic to be added, various types of antiseptic can be used. For example, not only antiseptic originating from natural components but composites can be used. Preferably, antiseptic originating from natural components should be used so as to minimize the adverse affect on the environment due to antiseptic disposed of after use.

Furthermore, colorant may be supplied in addition to or instead of the above-described antiseptic to dye the elastic abrasive. Alternatively, a structure may be employed in which the added colorant is transferred to the surface of the workpiece when the elastic abrasive is bombarded on the workpiece to dye the workpiece.

Example of Manufacturing Elastic Abrasive According to the Embodiment

While 417 g of mixed powders produced by mixing 17 g of devil's tongue powders used to manufacture edible devil's tongue and 400 g of abrasive grains (green carborundum GC#320 manufactured by Fuji Manufacturing Co., Ltd.) were added to 600 g of water (preferably 40 to 50° C.) a small amount at a time, the mixture was stirred and kneaded to produce pasty kneaded material, which was left for 30 to 120 minutes to sufficiently swell the added devil's tongue powders in the mixed powders.

A coagulating liquid produced by adding 0.7 g to 1.5 g (1.1 g in the embodiment) of calcium hydroxide to 70 g of water (approximately 30° C.) was further added to the kneaded material that had been left for a predetermined period as described above, and the resultant mixture was then stirred and kneaded (a kneading machine was used in the embodiment).

The kneaded material mixed with the coagulating liquid was cast into a mold and was then left at room temperature for 60 to 180 minutes (120 minutes in the embodiment) until it coagulated. Thereafter, the solidified material was removed from the molding box, placed in water with a temperature of 75° C. to 85° C., and left for 30 to 60 minutes.

After the solidified material obtained as described above cooled down, it was crushed or cut into a predetermined size to produce the elastic abrasive. In the embodiment, the above-described solidified material was cut into a piece about 2 mm square and 1 mm in thickness, which were used as the elastic abrasive for the blasting method according to the present invention.

When the thin elastic abrasive with a shape of the piece having a smaller thickness than the length and the width in the manner is used, the ejected elastic abrasive can be easily made to fly in parallel along the surface shape of the workpiece W. It is desirable in producing a mirror-like finish or a smooth surface.

Operation and Effect

In the blasting machine 1 according to the present invention with the above-described structure, when the elastic abrasive ejected from the blasting gun 8 together with a compressed gas is bombarded on the surface of the workpiece W at an acute incident angle in the blasting chamber 21 formed in the cabinet 2, the elastic abrasive bombarded on the surface in the manner slides on the surface of the workpiece W in accordance with the velocity component represented by V·Cos θ in FIG. 7, and abrasive grains contained in the elastic abrasive cut the surface of the workpiece W to make the surface of the workpiece W smooth and mirror-like.

When the elastic abrasive coagulated in gel by kneading a mixture of devil's tongue powders, abrasive grains, and water and then adding a coagulant is to be used for the elastic abrasive according to the present invention, the elastic abrasive not only exhibits satisfactory elasticity, but also has relatively low adhesiveness. Thus, burrs removed from the workpiece W or cut powders do not easily adhere to the surface, and therefore, a change in cutting force due to adherence of such burrs or cut powders is not easily induced.

Furthermore, even when abrasive grains exposed on the surface fall out, the surface is worn away during operation and other abrasive grains embedded in the elastic abrasive are exposed. Therefore, regardless of repeated use, a change in cutting force is not easily induced.

The abrasive that has been used to cut the surface of the workpiece W in the manner falls to the bottom of the blasting chamber 21 formed in a hopper shape.

At the bottom of the cabinet 2, the blasting chamber 21 communicates with the abrasive-recovery tank 3 via the abrasive-recovery duct 91. Since the interior of the abrasive-recovery duct 91 is connected to the ventilator 6 via the dust collector 5 and is sucked by the ventilator 6, the elastic abrasive falling to the bottom of the blasting chamber 21 is recovered into the abrasive-recovery tank 3 via the abrasive-recovery duct 91, is sent to the blasting gun 8 via the abrasive-supplying conduit 93 communicating directly with the abrasive-recovery tank 3 (FIG. 1) or via the abrasive-pumping conduit 95 communicating with the abrasive-pressurizing tank 4 disposed below the abrasive-recovery tank 3 (FIG. 2), and is ejected together with a compressed gas in the blasting chamber 21 of the cabinet 2. Then, the above-described circulation is repeated.

As the elastic abrasive is ejected together with a compressed gas, slides on the surface of the workpiece, and is recovered and ejected repeatedly as described above, water contained in the elastic abrasive evaporates. As a result, the elastic abrasive loses its elasticity and becomes harder and more brittle due to evaporating water.

However, according to the blasting machine 1 of the present invention, water can be sprayed in the elastic abrasive circulatory system as described above in order to replenish the elastic abrasive with water. Thereby blasting can be carried out in a constant processing state, more specifically, without changing physical properties of the elastic abrasive, such as the elasticity and hardness, while the elastic abrasive is repeatedly used.

In particular, with the structure including the surface-reflectance detecting means 16 for detecting the surface reflectance of the workpiece or the test piece or the electrical-current detecting means 17 for monitoring an electrical-current value of the motor 35 that rotates the stirring vane 34 for stirring the abrasive in the abrasive-recovery tank 3, as well as the controller 15 for controlling the amount of liquid sprayed from the spray nozzle 72 based on a detection signal of the surface-reflectance detecting means 16 or the electrical-current detecting means 17, an optimal volume of water is automatically supplied according to a change in the water content of the elastic abrasive.

Thus the broadest claims that follow are not directed to a machine that is configured in a specific way. Instead, said broadest claims are intended to protect the heart or essence of the breakthrough invention. The invention is clearly new and useful. Moreover, it was not obvious to those of ordinary skill in the art at the time it was made, in view of the prior art when considered as a whole.

Moreover, in view of the revolutionary nature of the invention, it is clearly a pioneering invention. As such, the claims that follow are entitled to very broad interpretation so as to protect the heart of the invention, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described;

What is claimed is:

1. A blasting method used in a blasting process including an abrasive circulatory system from a blasting gun to an abrasive-recovery tank, in which:
   an abrasive is ejected together with a compressed gas from the blasting gun in a blasting chamber in a cabinet, the blasting chamber having a lower part thereof formed in a hopper shape;
   negative pressure is caused in the abrasive-recovery tank by the effect of an air flow generated by a ventilator for sucking air in the abrasive-recovery tank communicating with a bottom of the blasting chamber;
   the abrasive in the blasting chamber is recovered into the abrasive-recovery tank by the effect of the negative pressure; and
   the abrasive recovered into the abrasive-recovery tank is supplied to the blasting gun by using abrasive-supply means,
   the blasting method comprising the steps of:
   providing a plurality of workpieces with the same material, the same shape, and substantially the same processed surface;
   spraying liquid in an air flow for transporting the abrasive by using liquid-supply means in the abrasive circulatory system;
   blasting one workpiece with an abrasive containing a certain amount of the liquid by ejecting the abrasive sprayed with the liquid onto a surface of a workpiece at an acute incident angle;
   acquiring a surface reflectance, serving as a reference surface reflectance, after the blasting is completed;
   blasting the other workpiece with an abrasive containing an unknown amount of liquid;
   measuring a surface reflectance after the blasting is completed and comparing the measurement with the reference surface reflectance; and
   controlling an amount of the liquid sprayed so that the surface reflectance measured on the other workpiece becomes close to the reference surface reflectance,
   wherein the abrasive contains a certain amount of liquid to exhibit desired elasticity.

2. The blasting method according to claim 1, wherein the step of spraying the liquid is carried out by using the liquid in the form of droplets with a mean diameter of 10 µm or less.

3. The blasting method according to claim 1, wherein the step of spraying the liquid is carried out in an abrasive-recovery duct communicating between the cabinet and the abrasive-recovery tank and/or in the abrasive-recovery tank, and the abrasive in the form of a three-phase mixed fluid composed of a gas, a liquid, and a solid, serving as the abrasive is transported in the abrasive-recovery duct and/or in the abrasive-recovery tank.

4. The blasting method according to claim 1, wherein the step of spraying the liquid is carried out to a compressed gas before being introduced into the blasting gun to eject the abrasive in the form of a three-phase mixed fluid composed of a compressed gas, a liquid, and a solid, serving as the abrasive, from the blasting gun.

5. The blasting method according to claim 1, further comprising:
providing a blasting machine with a stirring vane that stirs the abrasive recovered at a bottom of the abrasive-recovery tank and a motor that rotates the stirring vane;
acquiring, as a reference electrical-current value, an electrical-current value of the motor measured when stirring the abrasive containing a certain amount of liquid in the abrasive-recovery tank;
measuring the electrical-current value of the motor while the blasting machine is in operation and comparing the measurement with the reference electrical-current value; and
controlling an amount of the liquid sprayed so that the measured electrical-current value becomes close to the reference electrical-current value.

6. The blasting method according to claim 1, wherein the abrasive is coagulated in gel by adding a coagulant to a pasty substance obtained by stirring and kneading a mixture of the abrasive grains in an amount of 5.0 to 50 times devil's tongue powders by weight and water in an amount of 30 to 50 times the devil's tongue powders by weight.

7. A blasting machine comprising:
a cabinet containing a blasting chamber having a lower part thereof formed in a hopper shape;
a blasting gun for ejecting an abrasive together with a compressed gas in the blasting chamber;
a cyclone abrasive-recovery tank communicating with a bottom of the blasting chamber;
a ventilator for sucking air in the abrasive tank;
abrasive-supply means for supplying a reusable abrasive recovered into the abrasive-recovery tank to the blasting gun; and
an abrasive circulatory system in which the abrasive ejected from the blasting gun is recovered into the abrasive-recovery tank by negative pressure caused by the ventilator and the recovered abrasive is supplied to the blasting gun,
liquid-supply means for spraying a predetermined liquid in an air flow for transporting the abrasive is provided in the abrasive circulatory system,
surface-reflectance measuring means for measuring a surface reflectance of a processed workpiece; and
a controller for comparing the surface reflectance measured by the surface-reflectance measuring means with a reference surface reflectance, which is a surface reflectance acquired from the workpiece processed by using the abrasive containing a certain amount of liquid, to control an amount of liquid sprayed by the liquid-supply means so that the measured surface reflectance becomes close to the reference surface reflectance,
wherein, the amount of the liquid sprayed by the liquid-supply means is variable.

8. The blasting machine according to claim 7, wherein the liquid-supply means is provided with a spray nozzle for spraying droplets with a mean diameter of 10 μm or less.

9. The blasting machine according to claim 7, wherein the liquid is sprayed by the liquid-supply means to an air flow in an abrasive-recovery duct communicating between the cabinet and the abrasive-recovery tank and/or in the abrasive-recovery tank.

10. The blasting machine according to claim 7, wherein the liquid is sprayed by the liquid-supply means to a compressed gas before being supplied to the blasting gun.

11. The blasting machine according to claim 7, further comprising:
a stirring vane that stirs the abrasive recovered at the bottom of the abrasive-recovery tank;
a motor that rotates the stirring vane;
electrical-current detecting means for detecting a value of an electrical current flowing in the motor; and
a controller that compares the electrical current detected by the electrical-current detecting means with a reference electrical-current value, which is an electrical-current value of the motor acquired by stirring the abrasive containing a certain amount of liquid in the abrasive-recovery tank, to control the amount of liquid sprayed by the liquid-supply means so that the measured electrical-current value becomes close to the reference electrical-current value,
wherein an amount of the liquid sprayed by the liquid-supply means is variable.

* * * * *